(12) United States Patent
Lien et al.

(10) Patent No.: US 7,922,136 B2
(45) Date of Patent: Apr. 12, 2011

(54) CONNECTION DEVICE FOR CONNECTING BOX TO BICYCLE HANDLEBAR

(75) Inventors: Chien Ping Lien, Taipei Hsien (TW); Tung Feng Wu, Changhua (TW)

(73) Assignee: Chien-Ping Lien, Taipei Hsien (TW)

( * ) Notice: Subject to any disclaimer, the term of this patent is extended or adjusted under 35 U.S.C. 154(b) by 534 days.

(21) Appl. No.: 12/213,404

(22) Filed: Jun. 19, 2008

(65) Prior Publication Data

US 2009/0314909 A1 Dec. 24, 2009

(51) Int. Cl.
*A47B 96/00* (2006.01)

(52) U.S. Cl. .................... 248/222.11; 224/431; 224/420

(58) Field of Classification Search ............ 248/221.11, 248/222.11, 222.51, 223.21; 224/420, 431, 224/437, 438, 458

See application file for complete search history.

(56) References Cited

U.S. PATENT DOCUMENTS

| 4,798,318 | A | * | 1/1989 | Irwin ............................. 224/438 |
| 5,282,554 | A | * | 2/1994 | Thomas ........................ 224/421 |
| 6,062,053 | A | * | 5/2000 | Ho .................................. 70/233 |
| 6,196,443 | B1 | * | 3/2001 | DiGiacomo ............. 228/180.22 |
| 6,328,190 | B1 | * | 12/2001 | Lohr ............................. 224/431 |

* cited by examiner

*Primary Examiner* — Gwendolyn Baxter
(74) *Attorney, Agent, or Firm* — Bacon & Thomas, PLLC (57) ABSTRACT

A connection device includes a fixing board connected to a rear end of a box, a main part and a clamping unit. A locking member extends through the front board and a spring contacts against between the locking member and a rear board. Two push rods extend from a lower end of a button and slidably connected with inclined surfaces of the locking member. A safety member is connected to a mediate portion of the button and includes a spring plate which contacts against the button. The clamping unit includes two collars which are securely engaged with the adjustment plate. A bridge member is connected between the two toothed members and supported on a lower side of a handlebar stem. The clamp pieces is located at an inner side of the toothed members and mounted on a handlebar.

4 Claims, 8 Drawing Sheets

CONNECTION DEVICE FOR CONNECTING BOX TO BICYCLE HANDLEBAR

FIELD OF THE INVENTION

The present invention relates to a connection device for securely connecting a box to a bicycle handlebar.

BACKGROUND OF THE INVENTION

A conventional connection device for connecting a box to a bicycle handlebar generally requires the user to use one hand to hold the box and the other hand to press a locking member of the connection device to complete the locking process. The installing processes obviously are not convenient for some of the users. Besides, the connection device employs a hook piece to hook on a protrusion, in order to easily disengage the box from the handlebar when needed, the hook is designed to have a shallow hook portion which might be disengaged from the protrusion by vibration when riding.

Another connection device for connecting a box to a bicycle handlebar uses a lock to lock the box to the handlebar. How to keep the key safely becomes a problem for the user because the box might not be disconnected from the handlebar often. Besides, the connection device can only be used on the handlebar which includes a vertical handlebar stem. If the handlebar stem is inclined, the connection device cannot be cooperated with this type of handlebar.

The present invention intends to provide a connection device for connecting a box to a bicycle handlebar, wherein the connection device can be used on any type of handlebars with a vertical handlebar stem or inclined handlebar stem. The connection device is also used for the handlebars of different sizes.

SUMMARY OF THE INVENTION

The present invention relates to a connection device for connecting a box to a bicycle handlebar, and the connection device comprises a fixing board connected to a rear end of a box and includes an insertion extending from a lower end thereof and two apertures are defined in two sides of a top of the fixing board. A slot is defined through the fixing board. A main part includes a front board, a back board and a locking unit, wherein the front board includes a groove defined in a lower end thereof so as to receive the insertion therein. Two protrusions extend from a top thereof and are engaged with the apertures. A passage is defined through the front board. The locking unit includes a locking member, a spring, a button and a safety member. The locking member includes a tongue extending from an end thereof and two inclined surfaces are defined on two sides of the locking member. The tongue extends through the passage of the front board and a spring is biased between the locking member and the back board. Two push rods extend from a lower end of the button and each push rod includes an inclined side so as to be slidably connected with the inclined surfaces of the locking member. Two engaging portions extend from a side of the safety member and engaged with two concavities defined on two sides of the button. A spring plate has one end fixed on the safety member and the other end of the spring plate extends beyond the other side of the safety member. The spring plate contacts against the button. Two stops and a trigger portion extend from the safety member, wherein the safety member is pushed by the spring plate and the two stops are rested on the back board so that the safety member cannot move downward. When pushing the trigger portion, the stops removed from the back board so that the button can be pushed downward to remove the locking member from the slot of the front board to release the locking status.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 11:
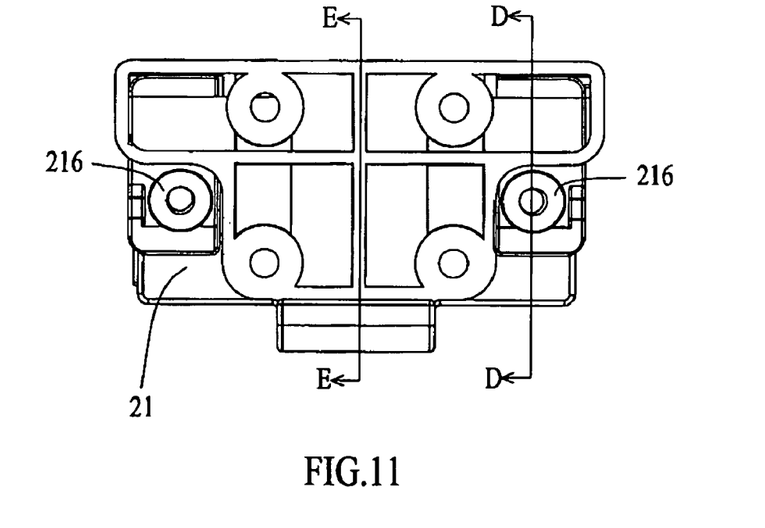
FIG. 11 shows a plane view of the connection of the fixing board and the main part of the connection device of the present invention.

Referring to FIGS. 1 to 6 and 9, the connection device for connecting a box to a bicycle handlebar of the present invention comprises a fixing board 1 connected to a rear end of a box 5 and including an insertion 12 extending from a lower end thereof and two apertures 14 defined in two sides of a top of the fixing board 1. A slot 13 is defined through the fixing board 1 and four through holes 11 are defined through four corners of the fixing board 1 so that rivets extend through the through holes 11 to connect the fixing board 1 and the box 5 as shown in FIG. 11.

Figure 1:
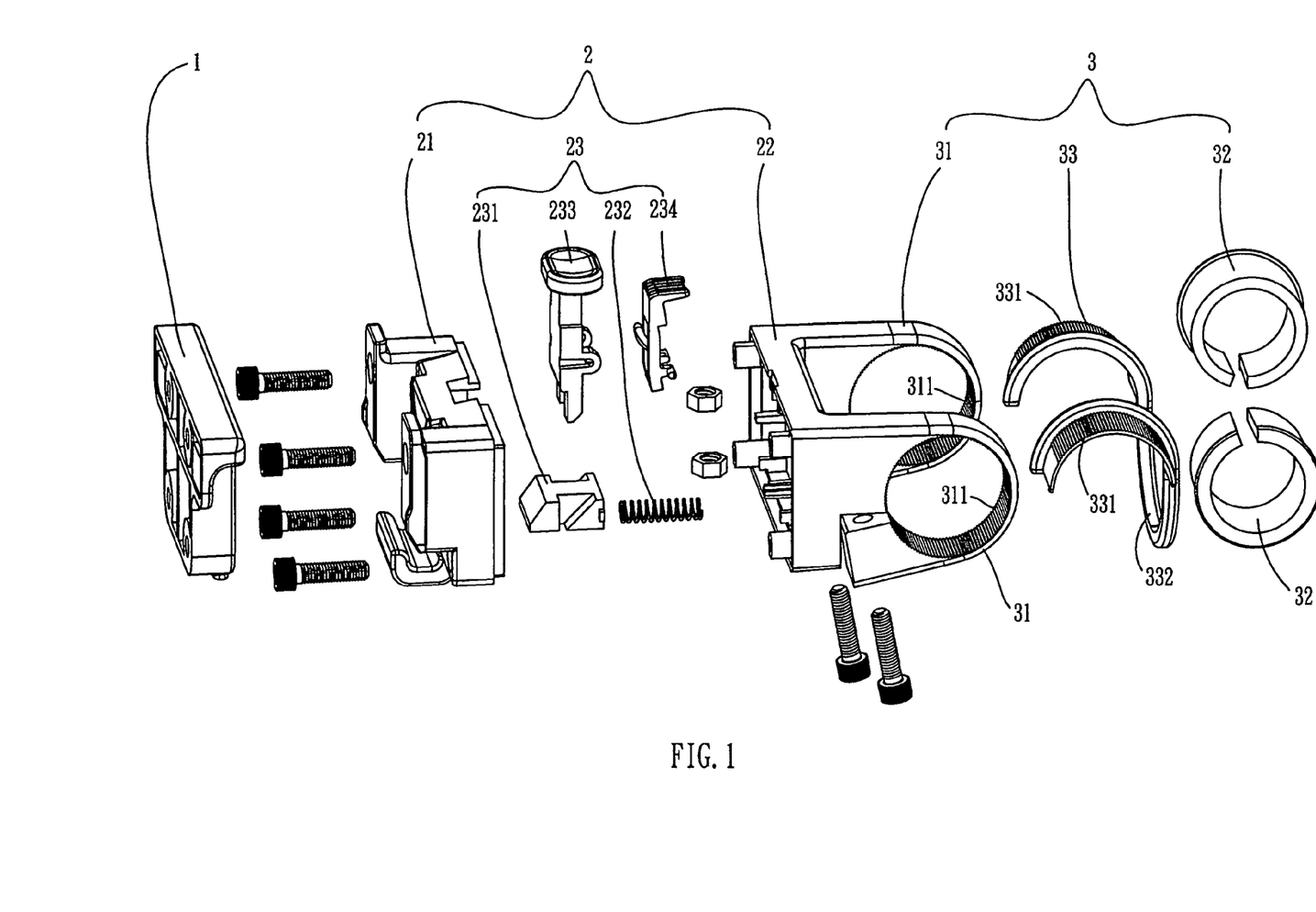
FIG. 1 is an exploded view to show the connection device of the present invention.
Figure 2:
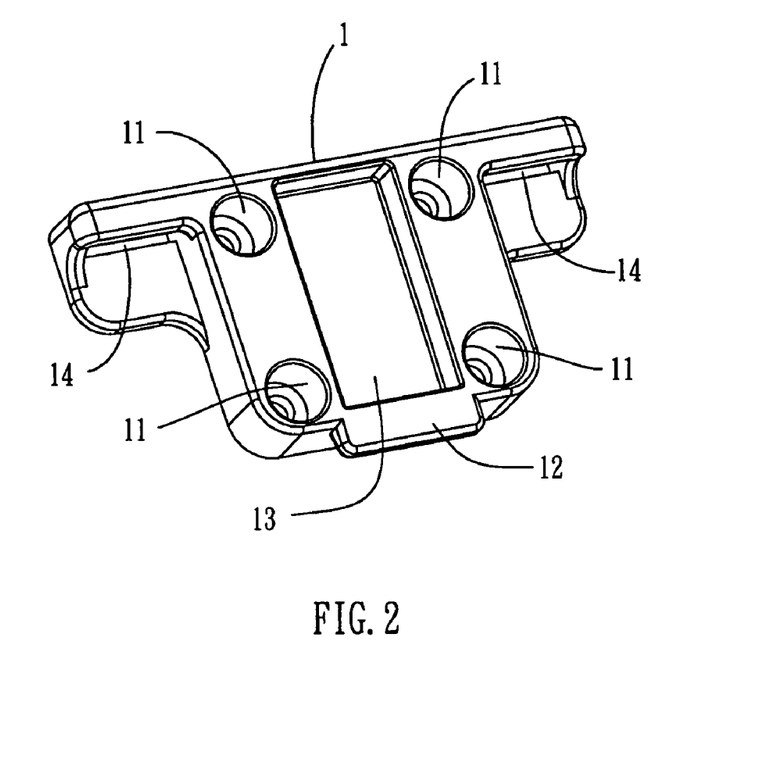
FIG. 2 shows the fixing board of the connection device of the present invention.
Figure 3:
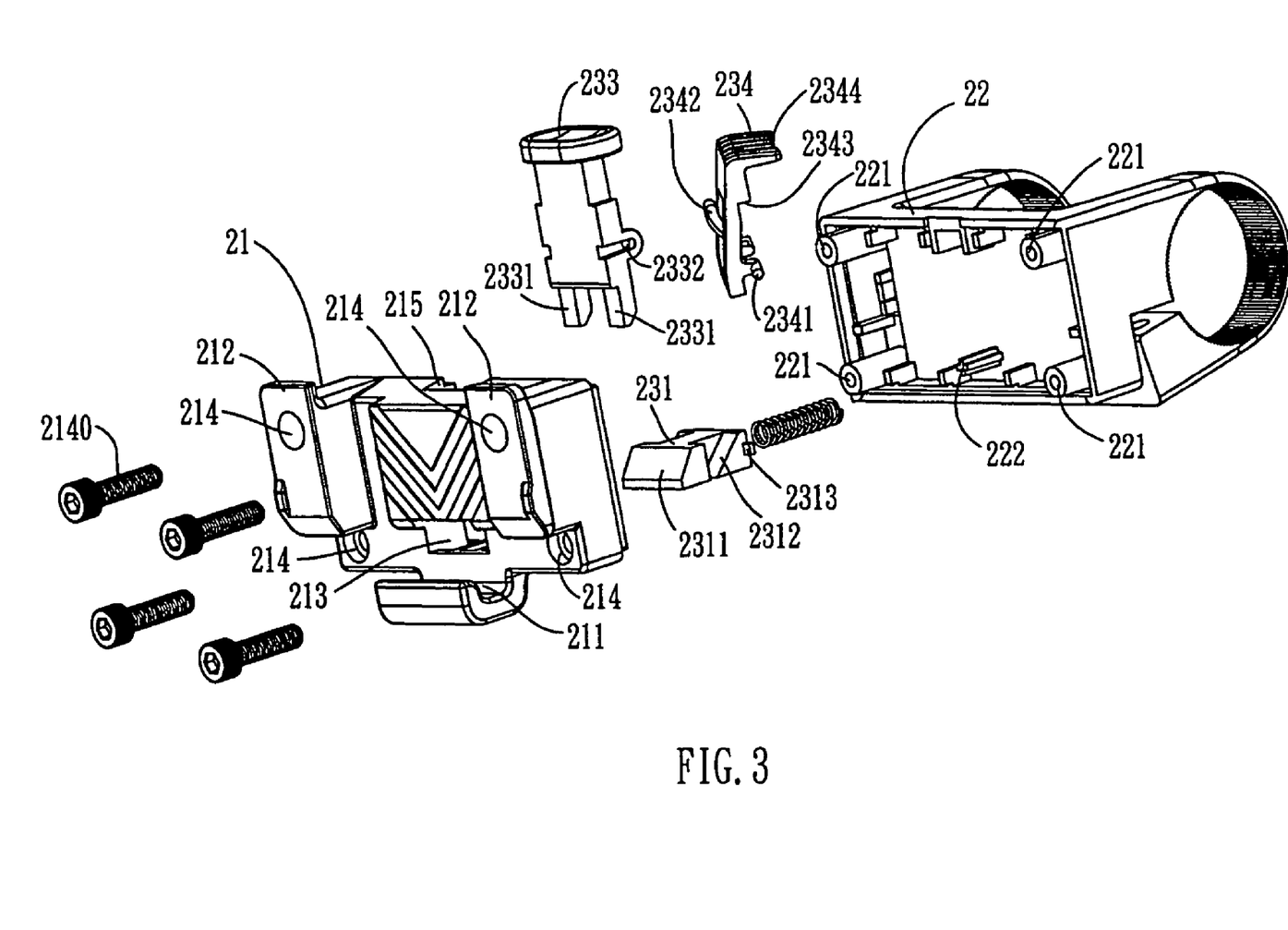
FIG. 3 is an exploded view to show the connection device of the present invention from another angle of view.
Figure 4:
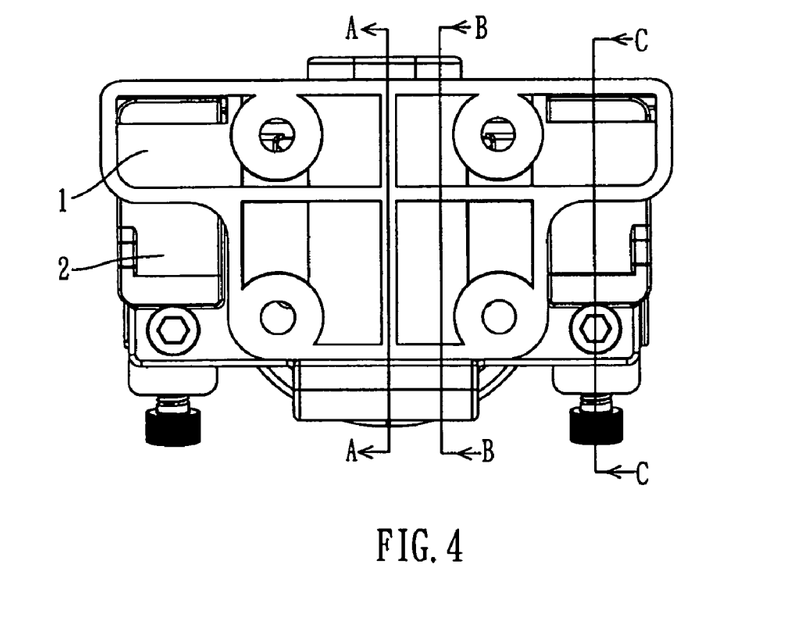
FIG. 4 shows a plane view of the connection of the fixing board and the main part of the connection device of the present invention.
Figure 5:
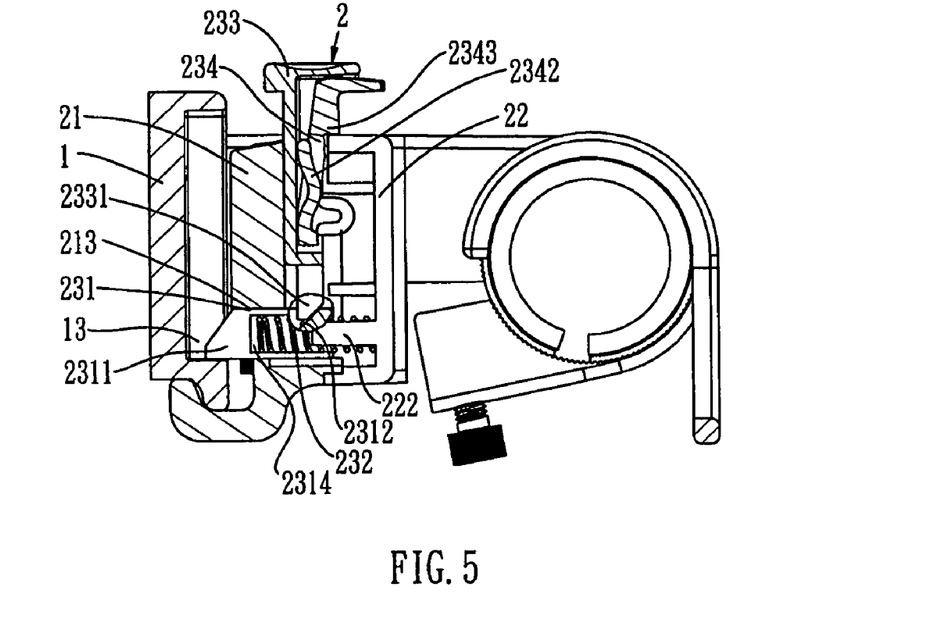
FIG. 5 is a partial cross sectional view, taken along line A-A in FIG. 4.
Figure 6:
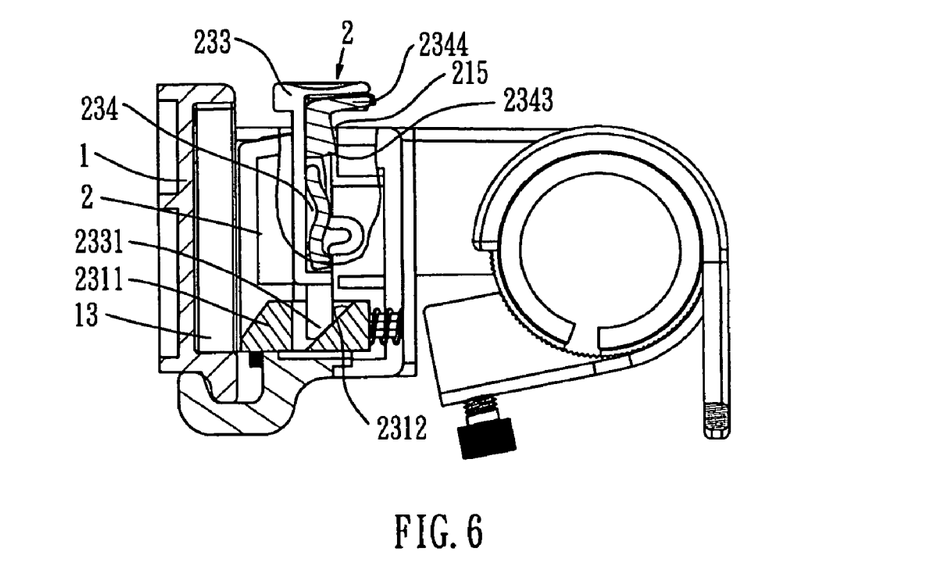
FIG. 6 is a partial cross sectional view, taken along line B-B in FIG. 4.

A main part 2 includes a front board 21, a back board 22 and a locking unit 23. The front board 21 includes a groove 211 defined in a lower end of a side facing the fixing board 1 and two protrusions 212 extend from a top thereof The insertion 12 of the fixing board 1 is engaged with the groove 211 of the front board 21 and the two protrusions 212 are engaged with the apertures 14 of the fixing board 1. Four holes 214 are defined through the front board 21 and four bolts 2140 extend through the holes 214 and are threadedly connected to connection tubes 221 extending from the back board 22. A passage 213 is defined through the front board 21 and a button space 215 is defined in the other side of the front board 21.

The locking unit 23 includes a locking member 231, a spring 232, a button 233 and a safety member 234. The locking member 231 includes a tongue 2311 extending from an end thereof and the tongue 2311 extends through the passage 213 of the front board 21. Two inclined surfaces 2312 are defined on two sides of the locking member 231. Two positioning members 2313 extend from two sides of the locking member 231 and located close to the other end of the locking member 231 so that a spring 232 has one end received in a recess 2314 defined in the end of the locking member 231 and the other end of the spring 232 is mounted to a protrusion 222 on the back board 22. Two push rods 2331 extend from a lower end of the button 233 and each push rod 2331 includes an inclined side which is slidably connected with the inclined surface 2312 of the locking member 231 corresponding thereto. Two engaging portions 2341 extend from a side of the safety member 234 and engaged with two concavities 2332 defined in two sides of the button 233. A spring plate 2342 has one end fixed on the safety member 234 and the other end of the spring plate 2342 extends beyond the other side of the safety member 234 and contacts against the button 233. Two stops 2343 and a trigger portion 2344 extend from the safety member 234. The safety member 234 is pushed by the spring plate 2342 and the two stops 2343 are rested on the back board 22 so that the safety member 234 cannot move downward.

Figure 7:
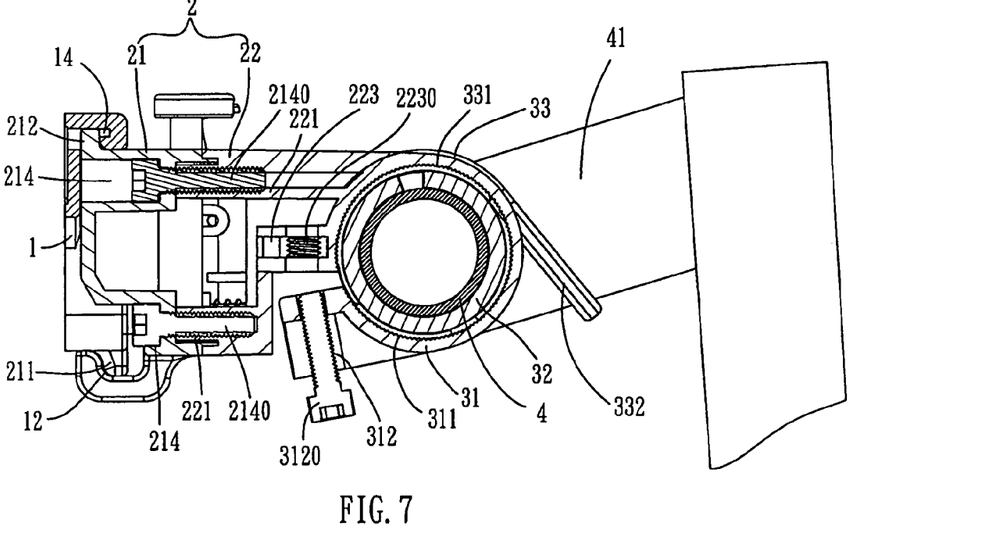
FIG. 7 is a partial cross sectional view, taken along line C-C in FIG. 4.
Figure 8:
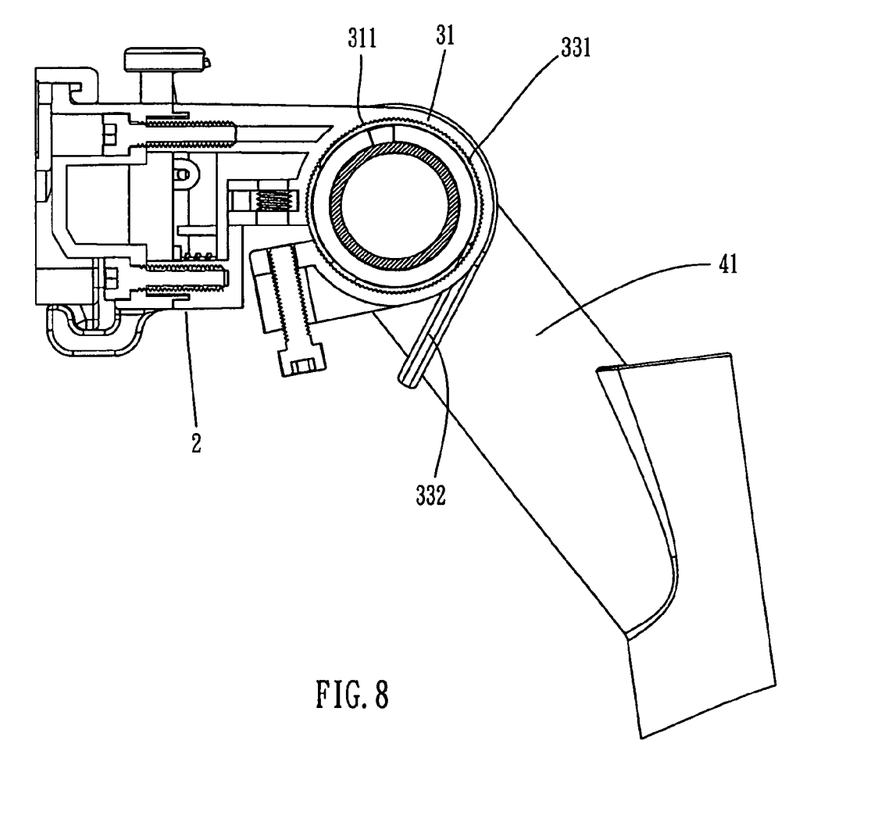
FIG. 8 is a partial cross sectional view to show the connection device is connected with different angle of handlebar stem.
Figure 9:
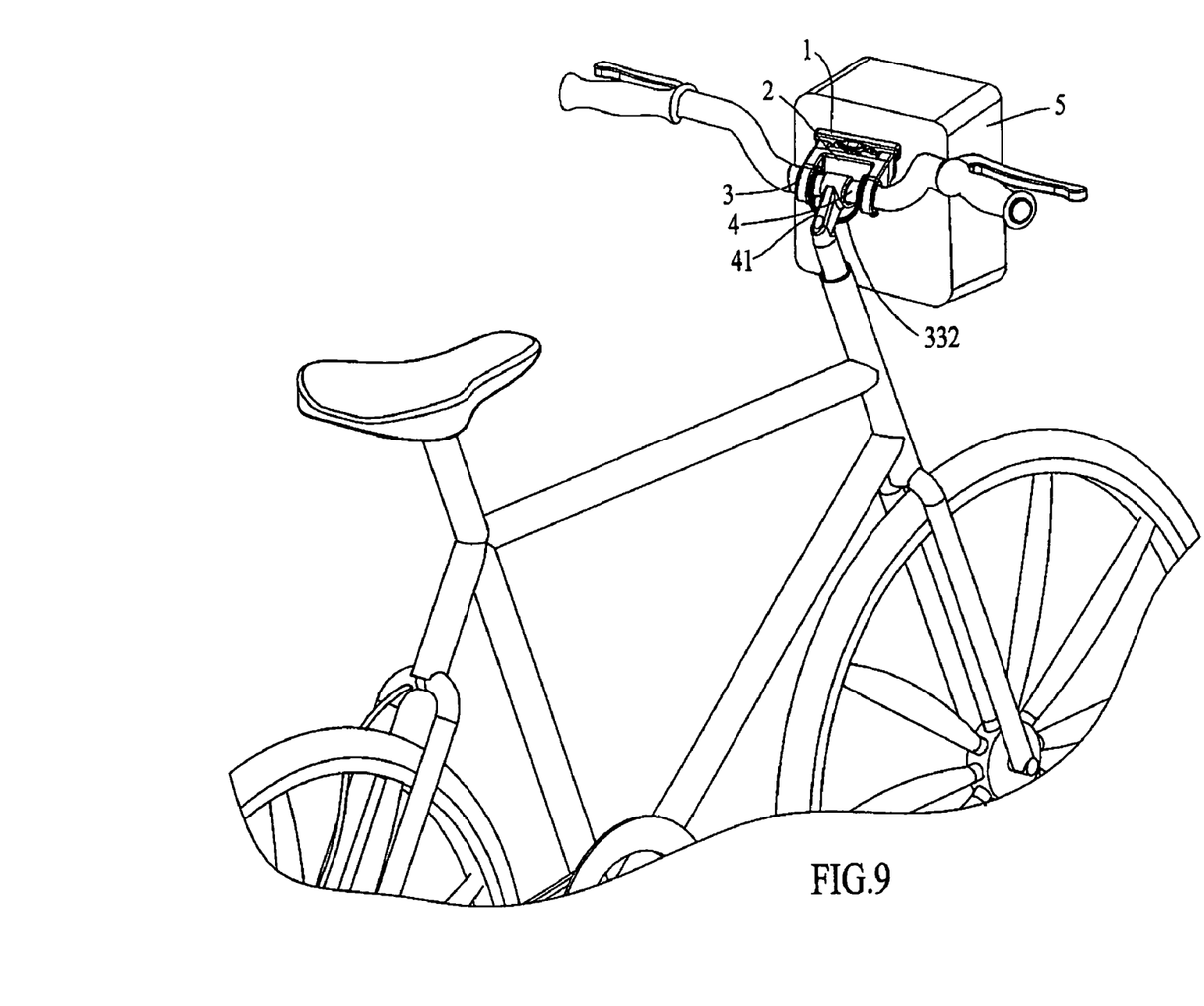
FIG. 9 shows a box is connected to the handlebar by the connection device of the present invention.

A clamping unit 3 includes two collars 31, two clamp pieces 32 and an adjustment plate 33. The two collars 31 are fixed to the back board 22 and opposite to the front board 21. Each collar 31 includes teeth 311 extending from an inner periphery thereof. The two clamp pieces 32 each are a C-shaped member. The adjustment plate 33 includes two C-shaped toothed members 331 and a bridge member 332 is connected between the two toothed members 331. The two toothed members 331 are located to be engaged with the teeth 311 of the collars 31 and the bridge member 332 is supported on a lower side of a handlebar stem 41 as shown in FIG. 7 or 8. The clamp pieces 32 is located at an inner side of the toothed members 331 and mounted on a handlebar 4.

As shown in FIGS. 7 and 8, the back board 22 includes two recesses 223 defined therein and two nuts 2230 are engaged with the two recesses 223. The collars 31 each have a threaded hole 312 and two bolts 3120 extend through the threaded holes 312 and are engaged with the nuts 2230 to tighten the collars 31 to securely tighten the collars 31 to the handlebar 4. When the handlebar stem 41 has different angle as shown in FIG. 8, the adjustment plate 33 can be adjusted to adjust the bridge member 332 to adapt the handlebar stem 41. The engagement of the teeth 311 and the toothed members 331 prevents rotation of the main part 2 relative to the handlebar 4.

Figure 10:
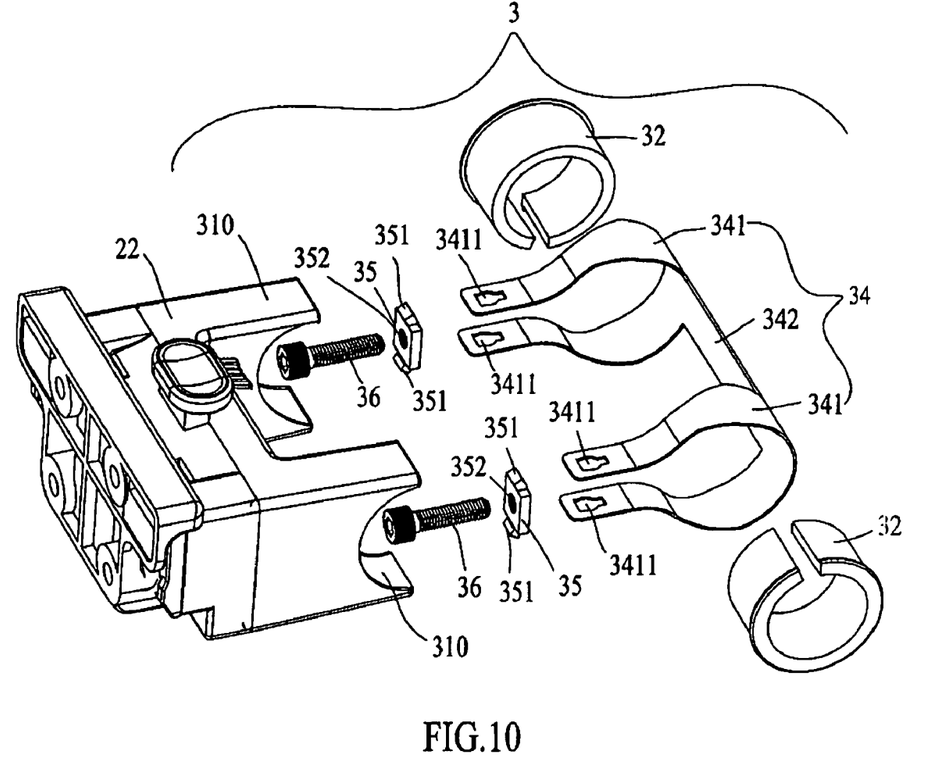
FIG. 10 shows another embodiment of the connection device of the present invention.
Figure 12:
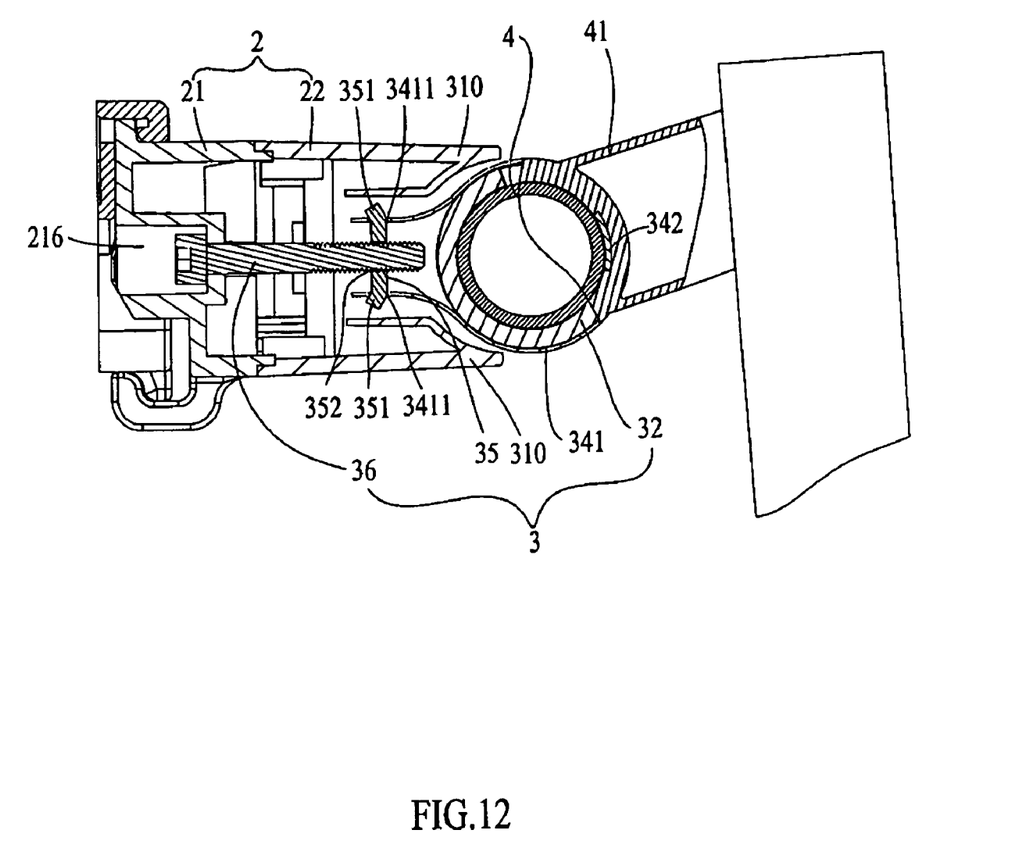
FIG. 12 is a partial cross sectional view, taken along line D-D and line E-E of the connection device shown in FIG. 10, the connection device is connected with a handlebar stem.

FIGS. 10 to 12 show another embodiment of the present invention, wherein the clamping unit 3 includes two C-shaped protrusions 310 extending from a rear end thereof. A steel belt 34 has two C-shaped clamping rings 341 on two ends thereof and a transverse portion 342 is connected between the two clamping rings 341. Each C-shaped clamping ring 341 has two respective slots 3411 defined through two distal ends thereof. Two adjustment blocks 35 each having a threaded hole 352 defined in a center thereof and two protrusions 351 extend from a top and a bottom of the each adjustment block 35. Two C-shaped clamp pieces 32 are received in the two clamping rings 341 respectively and the two protrusions 351 are engaged with the two slots 3411 of the clamping ring 341 corresponding thereto. Two bolts 36 extend through the two respective threaded holes 352 of the two adjustment blocks 35.

The C-shaped clamp pieces 32 are mounted to the handlebar 4 and the front board 21 has two adjustment threaded holes 216 defined in two sides thereof. The bolts 36 extend through the adjustment threaded holes 216 and the threaded holes 352 of the two adjustment blocks 35 to pulls the clamping rings 341 tight. Therefore, the clamping unit 3 securely connects the main part 2 to the handlebar 4. Because the parts composing the clamping unit 3 are made by steel so that the main part 2 can bear heavy load and the transverse portion 342 is cooperated with the handlebar stem 41 so as to prevent the main part 2 from spinning when the load is heavy.

While we have shown and described the embodiment in accordance with the present invention, it should be clear to those skilled in the art that further embodiments may be made without departing from the scope of the present invention.

What is claimed is:

1. A connection device comprising:
  a fixing board connected to a rear end of a box and including an insertion extending from a lower end thereof and two apertures defined in two sides of a top of the fixing board, a slot defined through the fixing board;
  a main part including a front board, a back board and a locking unit, the front board including a groove defined in a lower end of a side facing the fixing board and two protrusions extending from a top thereof, the insertion of the fixing board engaged with the groove of the front board, the two protrusions engaged with the apertures of the fixing board, a passage defined through the front board, the locking unit including a locking member, a spring, a button and a safety member, the locking member including a tongue extending from an end thereof and two inclined surfaces defined on two sides of the locking member, two positioning members extending from two sides of the other end of the locking member, the tongue extending through the passage of the front board and the spring having one end connected to the locking member and the other end of the spring connected to the back board, two push rods extending from a lower end of the button and each push rod including an inclined side, the two push rods being slidably connected with the inclined surfaces of the locking member, two concavities defined on two sides of the button, two engaging portions extending from a side of the safety member and engaged with the two concavities of the button, a spring plate having one end fixed on the safety member and the other end of the spring plate extending beyond the other side of the safety member, the spring plate contacting against the button, two stops and a trigger portion extending from the safety member, the safety member being pushed by the spring plate and the two stops being rested on the back board so that the safety member cannot move downward, and
  a clamping unit for clamping the main part to a handlebar.

2. The device as claimed in claim 1, wherein a clamping unit includes two collars, two clamp pieces and an adjustment plate, the two collars are fixed to the back board and opposite to the front board, each collar includes teeth extending from an inner periphery thereof, the two clamp pieces each are a C-shaped member, the adjustment plate includes two C-shaped toothed members and a bridge member is connected between the two toothed members, the two toothed members are located to be engaged with the teeth of the collars, the bridge member are supported on a lower side of a handlebar stem, the clamp pieces are located at an inner side of the toothed members and mounted on the handlebar.

3. The device as claimed in claim 2, wherein the back board includes two recesses defined therein and two nuts are engaged with the two recesses, the collars each have a threaded hole and two bolts extend through the threaded holes and are engaged with the nuts to tighten the collars.

4. The device as claimed in claim 1, wherein the clamping unit includes two C-shaped protrusions extending from a rear end thereof, a steel belt has two C-shaped clamping rings on two ends thereof and a transverse portion is connected between the two clamping rings, each C-shaped clamping ring has two respective slots defined through two distal ends thereof, two adjustment blocks each have a threaded hole defined in a center thereof and two protrusions extend from a top and a bottom of the each adjustment block, two C-shaped clamp pieces are received in the two clamping rings respectively and the two protrusions are engaged with the two slots of the clamping ring corresponding thereto, the front board has two adjustment threaded holes defined in two sides thereof, two bolts extend through the two adjustment threaded holes of the front board and the two respective threaded holes of the two adjustment blocks, the transverse portion is cooperated with a handlebar stem so as to prevent the main part from spinning.

* * * * *